United States Patent
Sakurai

(10) Patent No.: US 7,859,714 B2
(45) Date of Patent: Dec. 28, 2010

(54) LIGHT EMITTING DEVICE INCLUDING POSITION DETERMINING MEMBER HAVING A HEIGHT THAT DETERMINES A DISTANCE BETWEEN A FOCUSING LENS ARRAY AND AN IMAGE CARRIER

(75) Inventor: Kazunori Sakurai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1183 days.

(21) Appl. No.: 11/461,974

(22) Filed: Aug. 2, 2006

(65) Prior Publication Data
US 2007/0047004 A1    Mar. 1, 2007

(30) Foreign Application Priority Data
Aug. 24, 2005 (JP) .............................. 2005-242237

(51) Int. Cl.
*G06K 15/12* (2006.01)
(52) U.S. Cl. .......................... 358/1.7; 358/1.1; 399/38; 399/46; 399/91; 399/107; 399/108; 399/109; 399/130; 399/177; 399/196; 399/198; 399/200; 399/201; 399/218
(58) Field of Classification Search .................. 358/1.1, 358/1.7; 399/38, 46, 91, 107, 108–109, 130, 399/177, 196, 198, 200, 201, 218
See application file for complete search history.

(56) References Cited

U.S. PATENT DOCUMENTS

| 5,886,728 | A  | * | 3/1999 | Hamada et al. | ............. 347/242 |
| 5,986,253 | A  | * | 11/1999 | Tabata | ..................... 250/208.1 |
| 6,239,421 | B1 | * | 5/2001 | Nagata et al. | ............ 250/208.1 |
| 2002/0018251 | A1 | * | 2/2002 | Tsuyuki | ..................... 358/482 |

FOREIGN PATENT DOCUMENTS

| JP | A-5-88062 | 4/1993 |
| JP | A-7-195731 | 8/1995 |
| JP | B2-2590003 | 12/1996 |
| JP | B2-3178623 | 4/2001 |

* cited by examiner

*Primary Examiner*—King Y Poon
*Assistant Examiner*—Kenneth Kwan
(74) *Attorney, Agent, or Firm*—Oliff & Berridge, PLC

(57) ABSTRACT

A light emitting device that forms a latent image by irradiating light onto a charged surface of an image carrier. The light emitting device includes an electro-optical substrate that forms an optical image, a focusing lens array that focuses light from the electro-optical substrate to form an erect image of the corresponding optical image on the charged surface, and a frame in which the focusing lens array is fixed. A position determining member, which is formed of resin, is disposed on the frame, comes in contact with a supporting body that supports the image carrier, and determines a distance between the focusing lens array and the image carrier by its own height.

6 Claims, 14 Drawing Sheets

LIGHT EMITTING DEVICE INCLUDING POSITION DETERMINING MEMBER HAVING A HEIGHT THAT DETERMINES A DISTANCE BETWEEN A FOCUSING LENS ARRAY AND AN IMAGE CARRIER

The entire disclosure of Japanese Patent Application No: 2005-242237, filed Aug. 24, 2005 is expressly incorporated by reference herein.

BACKGROUND

1. Technical Field

The present invention relates to a light emitting device, a manufacturing apparatus and method thereof, and an image printing apparatus.

2. Related Art

There is an image printing apparatus in which an image carrier such as a photosensitive drum is charged, a latent image is formed on a photosensitive surface thereof, and toner is attached onto the latent image, thereby forming an image to be transferred onto other object. The image printing apparatus includes a light emitting device which irradiates light onto the photosensitive surface to form the latent image. The light emitting device many include a light emitting substrate on which a plurality of light emitting elements are arranged to form an optical image. Further, the light emitting device may include a focusing lens array which forms an image on the photosensitive surface by transmitting light received from the light emitting substrate.

In the focusing lens array, light used to form the optical image is incident from one end thereof and light used to form an erect image of a corresponding optical image is emitted from the other end thereof. If a distance between an optical imaging surface of the light emitting substrate and the focusing lens array is equal to an object distance, and a distance between the focusing lens array and the photosensitive surface is equal to an image surface distance, the light emitting device having the focusing lens array can form an erect image having the same magnification as the optical image formed on the optical imaging surface. Meanwhile, if the distance between the focusing lens array and the photosensitive surface is not equal to the image surface distance, there is deterioration in precision of the image formed on the photosensitive surface, and further printing quality of the image printing apparatus.

The image surface distance is defined as an ideal distance between the other end of the focusing lens array and the photosensitive surface, and is determined by a distance between one end of the focusing lens array and the other end thereof, that is, a thickness of the focusing lens array. Since the thickness of the focusing lens array has a manufacturing variation (for example, ±0.1 mm), the image surface distance also has the manufacturing variation. That is, the image surface distance is intrinsic to the focusing lens array.

By taking the above description into account, a technique has been proposed to adjust the distance between the focusing lens array and the image carrier. An example of the technique may include a technique which adjusts the distance between a lens array and the photosensitive drum by rotating an adjusting screw and has a structure in which, while a holder that supports the lens array is urged towards the photosensitive drum by a leaf spring, the front end of the adjusting screw that passes through a corresponding holder is screw-bonded so as to come in contact with a member that supports the photosensitive drum (see Japanese Patent No. 3,178,623, FIG. 1).

However, in this technique, a mechanical adjusting tool such as the adjusting screw is required, and thus a structure of the light emitting device becomes complex. Further, after the distance between the focusing lens array and the image carrier is determined, if the adjusting screw unexpectedly rotates, the distance deviates from an optimum distance. Furthermore, although a mechanical tool may be installed to avoid this deviation, the structure of the light emitting device may be further complex.

SUMMARY

An advantage of some aspects of the invention is to provide a light emitting device which is urged towards an image carrier and in which a distance between a focusing lens array and the image carrier can be equal to an optimum distance (an image surface distance) that is intrinsic to the focusing lens array, a manufacturing apparatus and method, and an image printing apparatus.

According to a first aspect of the invention, there is provided a light emitting device, in which an image carrier is charged, a latent image is formed on a charged surface of the image carrier, an image is formed by attaching toner onto the latent image, and which is used in an image printing apparatus transferring the image onto other object and forms the latent image by irradiating light onto the charged surface, the light emitting device comprising: an electro-optical substrate that forms an optical image; a focusing lens array in which light used to form the optical image is incident from one end thereof and light used to form an erect image of a corresponding optical image is emitted from the other end thereof; a frame in which the focusing lens array is fixed, with the other end facing the charged surface; and a position determining member which is formed of resin, is disposed on the frame, comes in contact with a supporting body that supports the image carrier, and determines a distance between the focusing lens array and the image carrier by its own height.

In this case, the electro-optical substrate is defined as a substrate on which electro-optical elements having a light emission characteristic or an optical characteristic varies depending on an electrical operation are arranged. Examples of the electro-optical elements include a light emitting element such as EL (Electro luminescent) element or a light valve element such as a liquid crystal element. However, when the light valve element is used as the electro-optical element, a light source is required in addition to the electro-optical substrate. Each of the electro-optical elements forms pixels constituting an optical image. Thus, the electro-optical substrate is also a substrate on which the pixels are arranged.

Since the position determining member is formed of resin, the forming thereof is easily carried out, and any height of the location determining member can be used. Thus, it is possible to use the position determining member with an optical height (an image surface distance) which is intrinsic to the focusing lens array, that is, the distance between the focusing lens array and the image carrier can be equal to the optical height. Accordingly, the light emitting device can be manufactured such that the distance between the focusing lens array and the image carrier is equal to the optimum distance without having to use the mechanical adjusting tool such as the adjusting screw.

According to a second aspect of the invention, there is provided an image printing apparatus having the aforementioned light emitting device, and irradiating light emitted from the other end onto the charged surface. Since the light emitting device is used as the exposure head, an image can be further precisely formed on the photosensitive drum. That is, the printing quality can be improved. In addition, since a task for matching the distance between the focusing lens array and the image carrier to the optimum distance only brings the position determining member into contact with the supporting body when being supported to a chassis of the image printing apparatus, the task becomes significantly easier than the case of using the mechanical adjusting tool.

According to a third aspect of the invention, there is provided a manufacturing apparatus for the aforementioned light emitting device, the manufacturing apparatus comprises: a compression unit which compresses resin that forms the position determining member in association with the frame; a driving unit which relatively transfers the frame and the compression unit to which the focusing lens array is fixed; and a cure promoting unit which cures the resin disposed between the frame and the compression unit relatively transferred by the driving unit.

In this case, the manufacturing apparatus cures a resin which is disposed on the frame and is in contact with the compression unit after the frame and the compression unit are relatively transferred, thereby forming the position determining member. That is, the position determining member can be formed to have any height. Accordingly, the light emitting device can be manufactured such that the distance between the focusing lens array and the image carrier is equal to the optimum distance without having to use the mechanical adjusting tool such as the adjusting screw.

Further, an photo curable resin that changes from liquid to solid due to an optical operation may be used as the resin that forms the position determining member, and the cure promoting unit may irradiate light onto the photo curable resin which is disposed on the frame and is in contact with the compression unit so as to promote curing thereof. Furthermore, a thermosetting resin that is irreversibly cured by heating may be used as the resin that forms the position determining member, and the curing thereof may be promoted by heating the thermosetting resin which is disposed on the frame and is in contact with the compression unit.

It is desired that pixels constituting the optical image are arranged on the electro-optical substrate in the manufacturing apparatus. Further, the manufacturing apparatus includes: an image acquisition unit which has an image acquisition surface, forms a pixel image on the image acquisition surface by acquiring an image of the pixel through the focusing lens array, and generates image data that indicates distribution of light intensity of the image acquisition surface; a pixel image size computation unit which computes and obtains a size of the pixel image based on the generated image data; and an optimum position determining unit which controls transferring performed by the driving unit, determines whether the distance between the focusing lens array and the image acquisition surface is substantially equal to a image surface distance that is intrinsic to the focusing lens array, and, if it is substantially equals thereto, stops the relative-transferring performed by the driving unit. Furthermore, relative heights of the frame side surface of the compression unit and the image acquisition surface are equal to relative heights of the frame side surface of the supporting body and a surface on which light is irradiated from the image carrier.

In this case, when the relative position between the focusing lens array and the image acquisition surface is optimized, the relative transferring performed by the driving unit stops to cure the resin. Accordingly, the position determining member can be formed such that the distance between the focusing lens array and the image carrier becomes the optimum distance. As described above, the manufacturing apparatus can manufacture the light emitting device in which the distance between the focusing lens array and the image carrier becomes the optimum distance without having to measure the image surface distance that is intrinsic to the focusing lens array. In addition, the position determining member can be automatically formed.

It is desirable that the manufacturing apparatus includes a resin supply unit which supplies the resin between the frame and the compression unit transferred by the driving unit. When the resin supply unit is not provided, the resin is disposed on the frame prior to the relative transferring performed by the driving unit, and thus the resin is pressed in its height direction during the relative transferring. Similarly to the thermosetting resin, when the resin does not naturally return to its original condition if it is pressed even before the curing thereof, as described above, the aforementioned determining method by using the drive control unit is restricted. On the other hand, when the resin supply unit is provided, since the frame and the compression unit stop first, and only thereafter the resin can be supplied therebetween, the aforementioned determining method by using the drive control unit does not have to be restricted.

According to a fourth aspect of the invention, there is provided a manufacturing apparatus for the aforementioned light emitting device, comprising: a fusion promotion unit which heats and melts the resin that forms the position determining member; a compression unit which compresses the melted resin in association with the frame; and a driving unit which relatively transfers the frame and the compression unit to which the focusing lens array is fixed.

In this case, the manufacturing apparatus can relatively transfer the frame and the compression unit by melting the resin. Since the resin is naturally solidified if not heated, the position determining member can be formed to have any height. Accordingly, the light emitting device can be manufactured such that the distance between the focusing lens array and the image carrier is equal to the optimum distance without having to use the mechanical adjusting tool such as the adjusting screw. In addition, the resin may be the thermosetting resin.

According to a fifth aspect of the invention, there is provided a manufacturing method of a light emitting device, in which an image carrier is charged, a latent image is formed on a charged surface of the image carrier, an image is formed by attaching toner onto the latent image, and which is used in an image printing apparatus transferring the image onto other object and forms the latent image by irradiating light onto the charged surface. Further, when a focusing lens array, in which light used to form the optical image is incident from one end thereof and light used to form an erect image of a corresponding optical image is emitted from the other end thereof, is arranged in a frame in which the focusing lens array is fixed, with the other end facing the charged surface, and forms a position determining member that comes in contact with the supporting body, a compression unit which compresses the frame and a resin that forms the position determining member in association with the frame is relatively transferred. Furthermore, the resin, which is disposed on the frame relatively transferred and is in contact with the compression unit, is cured.

In this case, the manufacturing apparatus cures a resin which is disposed on the frame and is in contact with the compression unit after the frame and the compression unit are relatively transferred, thereby forming the position determining member. That is, the position determining member can be formed to have any height. Accordingly, the light emitting device can be manufactured such that the distance between the focusing lens array and the image carrier is equal to the optimism distance without having to use the mechanical adjusting tool such as the adjusting screw.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
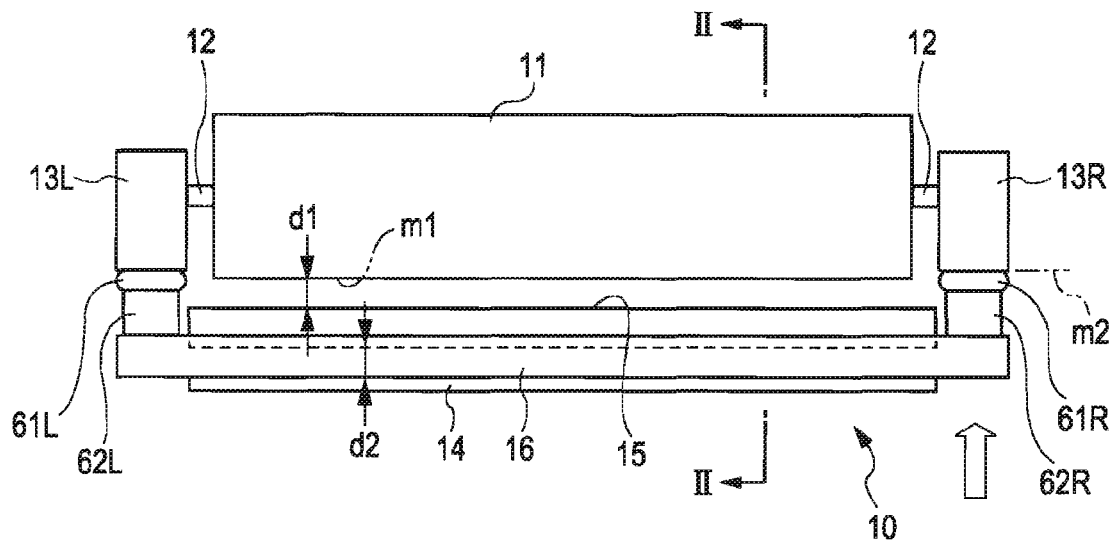
FIG. 1 is a front view of a light emitting device according to a first embodiments of the invention.

Hereinafter, exemplary embodiments of the invention will be described with reference to the accompanying drawings. In the drawings, scales of elements are appropriately different from actual scales thereof.

First Embodiment

Light Emitting Device

Figure 2:
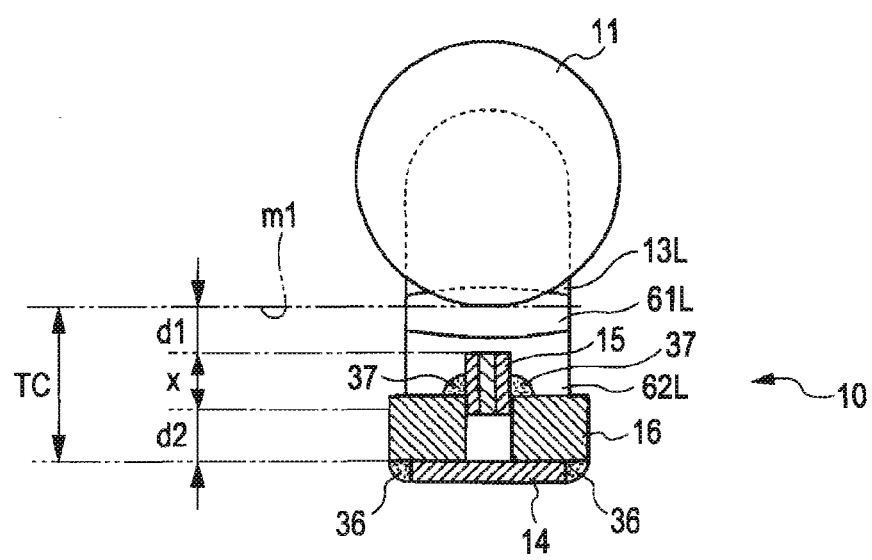
FIG. 2 is a cross-sectional view of FIG. 1, viewed along the line II-II.

FIG. 1 is a front view of a light emitting device 10 according to a first embodiment of the invention. FIG. 2 is a cross-sectional view of FIG. 1, viewed along the line II-II. The light emitting device 10 is used in an image printing apparatus in which a photosensitive drum 11 is charged, a latent image is formed on a charged photosensitive surface of the photosensitive drum 11, toner is attached onto the latent image to form an image to be transferred on other object such as a sheet of paper. The light emitting device 10 irradiates light onto the charged photosensitive surface to form the latent image.

The photosensitive drum 11 rotates about an axis 12 that is supported by bearings 13L and 13R fixed to a chassis of the image printing apparatus. The bearings 13L and 13R support the photosensitive drum 11 via the axis 12, and has a contact surface that comes in contact with position determining members 61L and 61R to be described below. The light emitting device 10 is urged towards the photosensitive drum 11 by a spring (not shown), and thus a relative position between the light emitting device 10 and the photosensitive drum 11 is fixed.

The light emitting device 10 includes a light emitting substrate 14, a focusing lens array 15, and a frame 16. In the light emitting substrate 14, an optical image is formed on a long and thin optical imaging surface inside thereof, and light thereof is emitted from a light emitting surface towards upper side of the drawing. The optical imaging surface is defined as a surface on which an optical image to be formed on the photosensitive surface of the photosensitive drum 11 is formed. The focusing lens array 15 serves to form an erect image of a corresponding image on the photosensitive surface of the photosensitive drum 11 by allowing light received from the light emitting substrate 14 to be incident from a long and thin incident surface (one end) and to be emitted from a long and thin illuminating surface (the other end). The frame 16 fixes the light emitting substrate 14 and the focusing lens array 15, and is formed to be long and thin.

The frame 16 is a rim of which an inner circumference has a rectangular shape, and is formed of aluminum, plastic, or the like. The frame 16 is provided with a through-hole which passes through from a flat surface facing the photosensitive drum 11 to a rear flat surface at the other side. A wall of the through-hole is the aforementioned inner circumference. A portion of the focusing lens array 15 is inserted into the through-hole.

The light emitting substrate 14 is disposed at the rear side of the frame 16, and is fixed to the frame 16. The fixing is carried out by using an adhesive 36. The adhesive 36 may be a thermosetting adhesive or an ultraviolet curable adhesive. Further, the light emitting substrate 14 is disposed such that the light emitting surface comes in contact with the rear surface of the frame 16 to cover the through-hole.

A plurality of light emitting elements, more specifically, organic EL (Electro luminescent) elements, are arranged in the opposite side of the light emitting surface of the light emitting substrate 14 in a bus line direction of the photosensitive drum 11. Since each of the organic EL elements forms a pixel, a plurality of pixels are arranged on the light emitting substrate 14 in a direction of the axis 12. Although not shown, a sealing substrate that seals the plurality of organic EL elements in association with the light emitting substrate 14 is placed on the light emitting substrate 14.

The focusing lens array 15 is disposed on the surface side of the frame 16, and is fixed to the frame 16, while the illuminating surface faces an imaging surface m1. The fixing is carried out by using an adhesive 37. The adhesive 37 may be a thermosetting adhesive or an ultraviolet curable adhesive. The incident surface of the focusing lens array 15 rightly faces the light emitting surface of the light emitting substrate 14 within the through-hole of the frame 16. Further, the focusing lens array 15 is formed by arranging a plurality of gradient index lenses in a long and thin manner. Each of the gradient index lenses is a graded index optical fiber which is formed such that a refractive index is low at an optical axis, that is, a central axis. In this case, the farther from the central axis, the greater the refractive index is. A length of the optical fiber is not only a thickness of the gradient index lens but also a thickness x of the focusing lens array 15.

An optical dimension of the focusing lens array 15 includes a conjugate length TC, an image surface distance d1, and an object distance d2. If the distance between the optical imaging surface and the imaging surface m1 is equal to the conjugate length TC, the distance between the illuminating surface of the focusing lens array 15 and the imaging surface m1 is equal to the image surface distance d1, and the distance between the optical imaging surface and the incident surface of the focusing lens array 15 is equal to the object distance d2, the focusing lens array 15 can form an erect image having the same magnification as the optical image formed on the imaging surface m1. Although the optical imaging surface seemingly coincides with the light emitting surface of the light emitting substrate 14 in the drawing, as described above, the two surfaces do not coincide with each other.

The optical dimension can be expressed as follows by using the thickness x of the focusing lens array 15.

$$TC = d1 + x + d2$$

$$d1 = d2$$

That is, when the thickness x of the focusing lens array 15 is determined, the image surface distance d1, the object distance d2, and the conjugate length TC are determined. Specifically, the focusing lens array 15 may be a SLA (SELFOC lens array) that can be obtained from Nippon Sheet Class. SELFOC is a trademark of Nippon Sheet Class.

The light emitting device 10 is constructed such that the distance between the illuminating surface of the focusing lens array 15 and the imaging surface m1, that is, the distance between the focusing lens array 15 and the photosensitive drum 11, is equal to an optimum height (the image surface distance d1 that is intrinsic to a corresponding focusing lens array 15). Specifically, a short side of the surface side of the frame 16 is provided with the position determining members 61L and 61R, and bases 62L and 62R on which the position determining members 61L and 61R are mounted. The bases 62L and 62R are a portion of the frame 16, and are erect towards the bearings 13L and 13R of the photosensitive drum 11.

The position determining members 61L and 61R determine the distance between the illuminating surface of the focusing lens array 15 and the imaging surface m1 by its own height. Further, the position determining members 61L and 61R are formed of a cured ultraviolet curable resin, and are disposed on the frame 16. Specifically, the position determining members 61L and 61R come in contact with the front end surfaces of the bases 62L and 62R, and are adhered to the bases 62L and 62R, while serving as an adhesive in itself. In addition, the position determining members 61L and 61R protrude from the bases 62L and 62R, and are in contact with the bearings 13L and 13R. This contact surface is referred to as a position determining surface m2. The heights of the position determining members 61L and 61R are predetermined such that the distance between the focusing lens array 15 and the photosensitive drum 11 becomes an optimum height.

According to the aforementioned light emitting device 10, the position determining members 61L and 61R are formed of a ultraviolet curable resin, and since the ultraviolet curable resin can be easily formed, it is possible to use the position determining members 61L and 61R with the optical height, that is, the distance between the focusing lens array 15 and the photosensitive drum 11 can be equal to the optical height. Further, the cured ultraviolet curable resin has a high rigidity. Therefore, after the light emitting device 10 is placed in the image printing apparatus, the distance between the focusing lens array 15 and the photosensitive drum 11 is significantly less likely to be deviated from the optical height.

Manufacturing Method and Apparatus

Now, a manufacturing method of the light emitting device 10 will be described.

Figure 3:
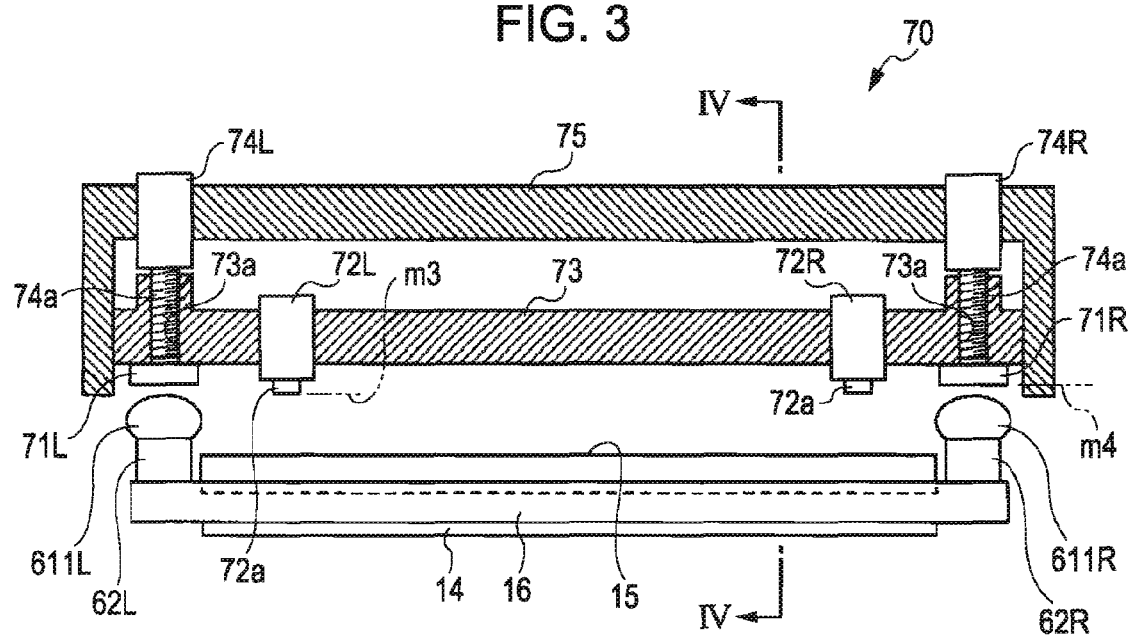
FIG. 3 is a front view showing an initial process of manufacturing the light emitting device.
Figure 4:
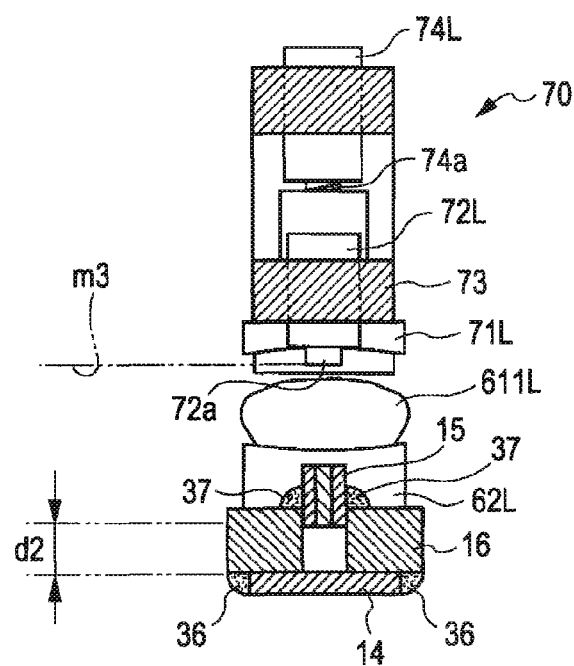
FIG. 4 is a cross-sectional view of FIG. 3, viewed along the line IV-IV.

Referring first to FIGS. 3 and 4, a manufacturing apparatus 70 is disposed above the light emitting device 10 during manufacturing. During manufacturing, the light emitting device 10 is completed except for the position determining members 61L and 61R, and is installed on a substantially horizontal stage (not shown), with the light emitting substrate 14 facing downwards. The manufacturing apparatus 70 is disposed such that a rising direction of a stage 73 to be described below coincides with a vertical direction, and the bases 62L and 62R overlap virtual position determining plates 71L and 71R to be described below.

The manufacturing apparatus 70 includes the virtual position determining plates 71L and 71R, cameras 72L and 72K, and the stage 73 that supports the virtual position determining plates 71L and 71R and the cameras 72L and 72R. The virtual position determining plates 71L and 71R compress ultraviolet curable resins 611L and 611R to be described below in association with the frame 16. Lower surfaces m4 of the virtual position determining plates 71L and 71R may be formed by coating Teflon (trademark). The cameras 72L and 72R include a light receiving unit 72a in which an image acquisition element, which outputs an electric signal based on intensity of the received light, is disposed on a light receiving surface to form an image acquisition surface m3. In addition, the cameras 72L and 72R acquire an image of pixels through the focusing lens array 15, and form a pixel image on the image acquisition surface m3. Thereafter, the cameras 72L and 72R generate and output distribution of light intensity of the image acquisition surface m3, that is, image data that represents an image formed on the image acquisition surface m3. The image acquisition element may be a CCD (charge coupled device).

The stage 73 supports the virtual position determining plates 71L and 71R and the cameras 72L and 72R such that the virtual position determining plates 71L and 71R are positioned at the lower surface side of the stage 73, the camera 72L is disposed near the position determining member 61L, the camera 72R is disposed near the position determining member 61R, the cameras 72L and 72R can acquire an image of the light emitting substrate 14 through the focusing lens array 15, and a relative height between the image acquisition surface m3 and the lower surface m4 becomes equal to a relative height between the imaging surface m1 and the position determining surface m2.

Screw holes 73a and 73a are formed at positions where the stage 73 overlaps the virtual position determining plates 71L and 71R, with their upper surfaces being open. Front ends of ball screws 74a and 74a are screw-bonded with respect to the screw holes 73a and 73a. The manufacturing apparatus 70 includes the ball screws 74a and 74a, motors 74L and 74R having rotation axes of the ball screws 74a and 74a, and a supporting portion 75 which supports the motors 74L and 74R. Both ends of the supporting portion 75 constitute a guide wall 75a of the stage 73.

Figure 5:
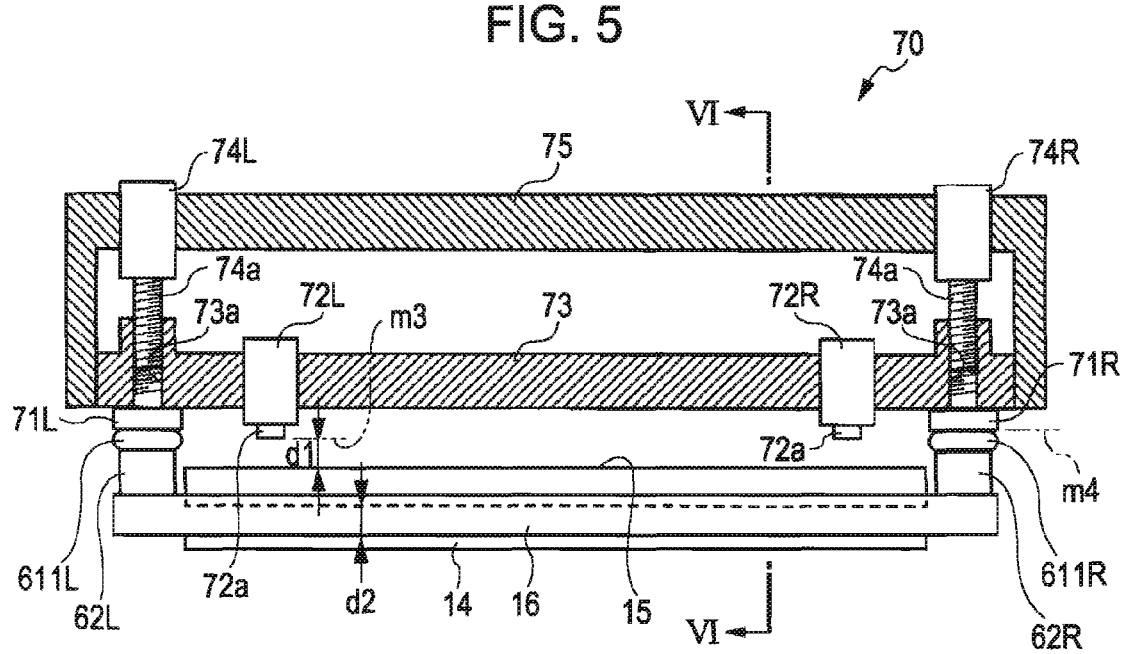
FIG. 5 is a front view showing a next process of FIG. 4.
Figure 6:
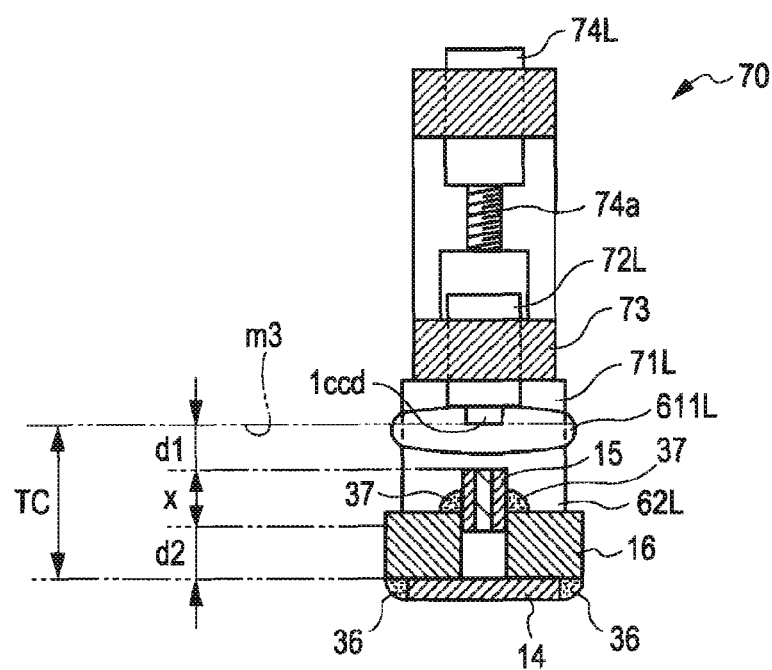
FIG. 6 is a cross-sectional view of FIG. 5, viewed along the line VI-VI.

Next, as shown in FIGS. 5 and 6, by relatively transferring the frame 16 and the stage 73, the distance between the focusing lens array 15 and the photosensitive drum 11 is matched to the optimum height. Specifically, the stage 73 is lifted while rotating the ball screws 74a and 74a by driving the motors 74L and 74L. The relative transferring is carried out based on image data output from the cameras 72L and 72R, and must include an aspect in which the stage 73 is lowered in a state that the lower surfaces m4 of the virtual position determining plates 71L and 71R come in contact with the resins 611L and 611R. In this aspect, the resins 611L and 611R are compressed while being pressed by the virtual position determining plates 71L and 71R.

Figure 7:
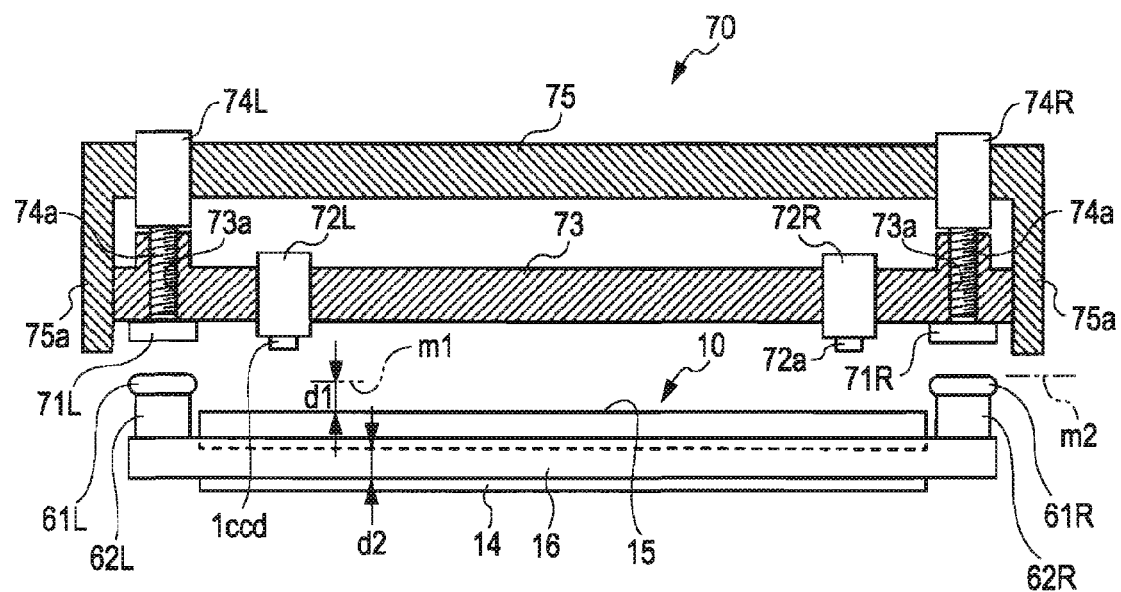
FIG. 7 is a front view showing a next process of FIG. 6.

Next, the resins 611L and 611R are cured by irradiating an ultraviolet ray onto the resins 611L and 611R. Accordingly, the position determining members 61L and 61R having optimum heights, that is, the position determining members 61L and 61R of which heights are determined such that the distance between the focusing lens array 15 and the photosensitive drum 11 becomes equal to the optimum height when in contact with the bearings 13L and 13R, are formed. Next, as shown in FIG. 7, the stage 73 is lifted. In this case, the position determining members 61L and 6LR are removed from the virtual position determining plates 71L and 71R, and remain on the bases 62L and 62R. Thus, the light emitting device 10 is completed.

Manufacturing Apparatus in Detail

If the operations of forming and curing the resins 611L and 611R are performed by human hands, it is sufficient to use the manufacturing apparatus 70 having the aforementioned structure. However, the manufacturing apparatus 70 according to the present embodiment of the invention has an additional structure in order to perform these operations smoothly and automatically.

Figure 8:
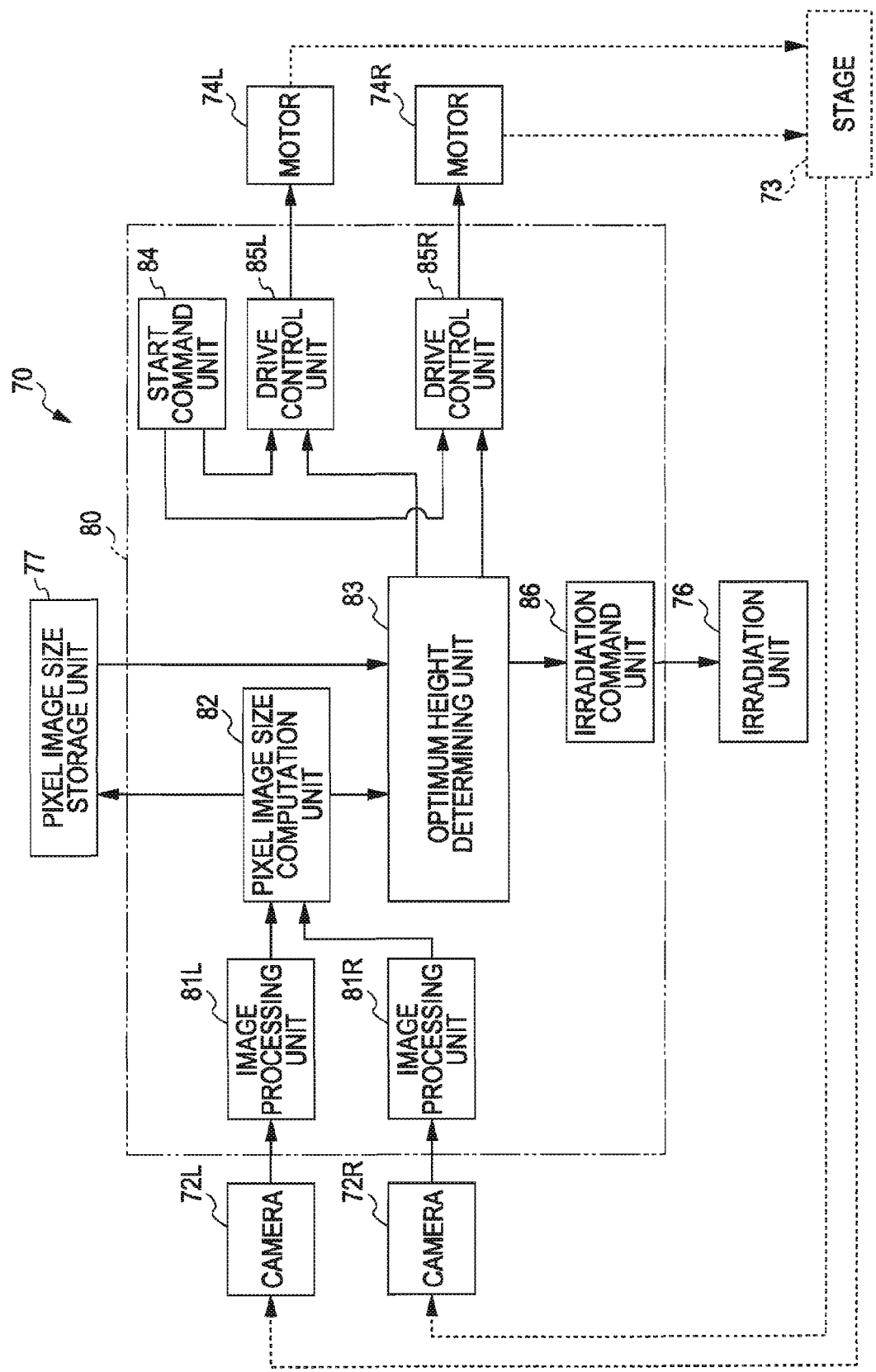
FIG. 8 is a block diagram showing a structure of a manufacturing apparatus that manufactures the light emitting device.

FIG. 8 is a block diagram showing a structure of the manufacturing apparatus 70. Referring to the drawing, the manufacturing apparatus 70 further includes an irradiation unit 76 which irradiates an ultraviolet ray onto the bases 62L and 62R, a pixel image size storage unit 77 which stores input data, and a CPU 80. The CPU 80 functions as image processing units 81L and 81R, a pixel image size computation unit 82, an optimum height determining unit 83, a start command unit 84, drive control units 85L and 85R, and an irradiation command unit 86. In general, the CPU 80 controls driving of the motors 74L and 74R and an operation of the irradiation unit 76 based on image data that is output from the cameras 72L and 72R.

Figure 9:
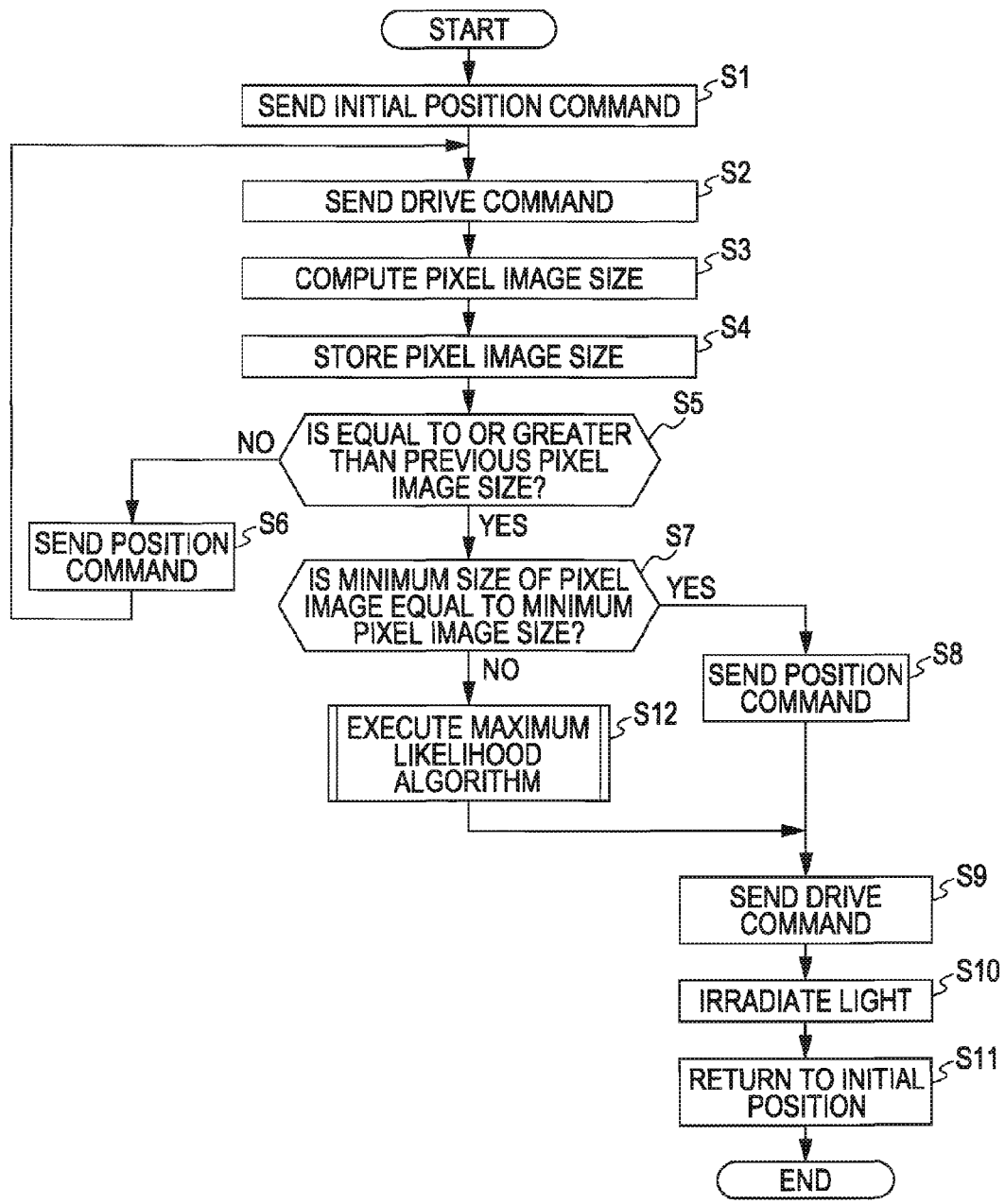
FIG. 9 is a flowchart showing an operation of a CPU of the manufacturing apparatus.

FIG. 9 is a flowchart showing an operation of the CPU 80.

First, referring to the drawing, as the start command unit 84, the CPU 80 (hereinafter, since it is apparent that the following steps are performed by the CPU 80, the CPU 80 will be omitted in the description) sends a position command that designates a predetermined position to the drive control units 85L and 85R (step S1). Next, as the drive control units 85L and 85R, a drive command for transferring the stage 73 to the position designated according to the position command is generated, and the drive command is sent to the motors 74L and 74L (step S2). Accordingly, the stage 73 is transferred. In this case, content stored in the pixel image size storage unit 77 is initialized. Specifically, the position designated according to the position command is determined such that the lower surfaces m4 of the virtual position determining plates 71L and 71R are positioned above the front end surface of the base 62 by a predetermined height. As a result, the stage 73 positioned at its initial position is lowered, and finally, the lower surfaces m4 of the virtual position determining plates 71L and 71R reach predetermined positions.

Figure 10:
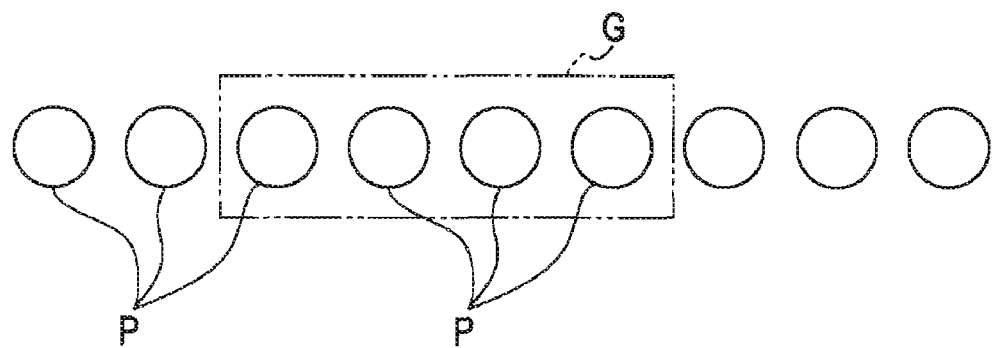
FIG. 10 shows image acquiring performed by cameras.
Figure 11:
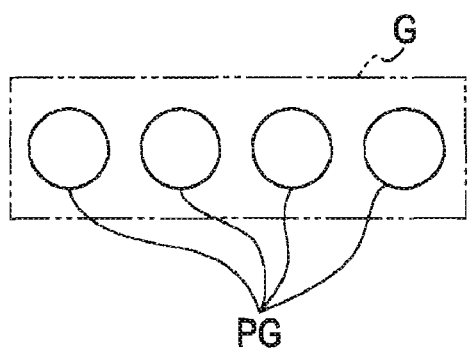
FIG. 11 shows an example of an image G acquired by the cameras.
Figure 12:
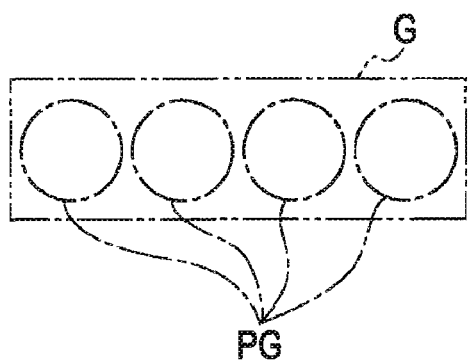
FIG. 12 shows another example of the image G acquired by the cameras.

When the lowering is completed, as shown in FIG. 10, the cameras 72L and 72R acquire an image of the light emitting substrate 14, and outputs image data. The image data output from the cameras 72L and 72R respectively become an image G including the plurality of pixels P. As shown in FIGS. 11 and 12, the image G includes a pixel image PG that is an image of the pixels P. FIG. 11 shows an example of the image G obtained when in focus. FIG. 12 shows an example of the image G obtained when out of focus. The both drawings apparently show that the pixel image PG becomes clear when in focus, and its area and diameter is decreased. On the contrary, when out of focus, the pixel image PG becomes unclear, and its size is increased. When in focus, the distance between the light emitting substrate 14 and the focusing lens array 15 is equal to the object distance d2 that is intrinsic to the focusing lens array 15, and the distance between the focusing lens array 15 and the image acquisition surface m3 is equal to the image surface distance d1 that is intrinsic to the focusing lens array 15. For example, when the size of the pixel image PG is the minimum, the distance between the focusing lens array 15 and the photosensitive drum 11 becomes the optimum height.

When the image data is output from the cameras 72L and 72R, as the image processing units 81L and 81R, the image data received from the cameras 72L and 72R are firstly processed, and data that can specify a pixel image size is generated. Further, as the pixel image size computation unit 82, the pixel image size is obtained from the generated data by carrying out computation (step S3). The pixel image size is obtained for each of the cameras 72L and 72R. The pixel image size is defined as a size of a pixel image, and is a representative value of a size of the pixel image PG. The representative value can be arbitrarily obtained. For example, an average of sizes of a plurality of pixel images PG included in one image G, or a sum of the sizes of these pixel images PG, may be used.

Next, as the pixel image size computation unit 82, for each of the cameras 72L and 72R, the obtained pixel image sizes are matched to the height of the image acquisition surface m3 of the present focusing lens array 15, and are stored in the storage unit 77 (step S4). Furthers as the optimum height determining unit 83, it is determined whether a pixel image size being currently obtained is equal to or greater than a minimum pixel image size Previously obtained (step S5). The determining is carried out for each of the cameras 72L and 72R. The determination result becomes positive only when both results obtained from the cameras 72L and 72R are positive. At this point, since the pixel image size is obtained for the first time, and the pixel image size previously obtained does not exist, the determination result is negative.

When the determination result of step S5 is negative, as the height determining unit 83, a position command for indicating a position of the stage 73, at which the obtained pixel image size is decreased, is sent to the drive control units 85L and 85R (step S6). Next, as the drive control units 85L and 85R, a drive command for transferring the stage 73 to the position designated according to the position command is generated, and is sent to the motors 74L and 74R (step S2). Accordingly, the stage 73 is transferred. Thereafter, steps S3 to S6, and S2 are repeatedly performed until the determination result of step S5 becomes positive.

When the determination result of step S5 is positive, as the height determining unit 83, it is determined whether a minimum size of the pixel image sizes stored in the pixel image size storage unit 77 is equal to the minimum pixel image size or not (step S7). The determining is carried out for each of the cameras 72L and 72R. The determination result becomes positive only when both results obtained from the cameras 72L and 72R are positive.

The minimum pixel image size is a minimum size of a pixel image obtained at the present disposition of the light emitting substrate 14 and the focusing lens array 15. Accordingly, in the case of an optimum disposition, the minimum pixel image size is equal to the size of the pixel P. Therefore, under the premise that the light emitting substrate 14 and the focusing lens array 15 are always disposed in an optimum manner, only one pixel size is determined for a common minimum pixel image size for all of the light emitting devices 10. However, the present embodiment of the invention is under the premise that the corresponding disposition is not always optimum. That is, in the present embodiment of the invention, the minimum pixel image size may be different for each of the light emitting devices 10. Therefore, in the present embodiment of the invention, according to a mathematical assumption based on the pixel image size and height stored in the pixel image size storage unit 77, the minimum pixel image size is dynamically determined for each of the cameras 72L and 72R. The mathematical assumption will be described below.

Figure 13:
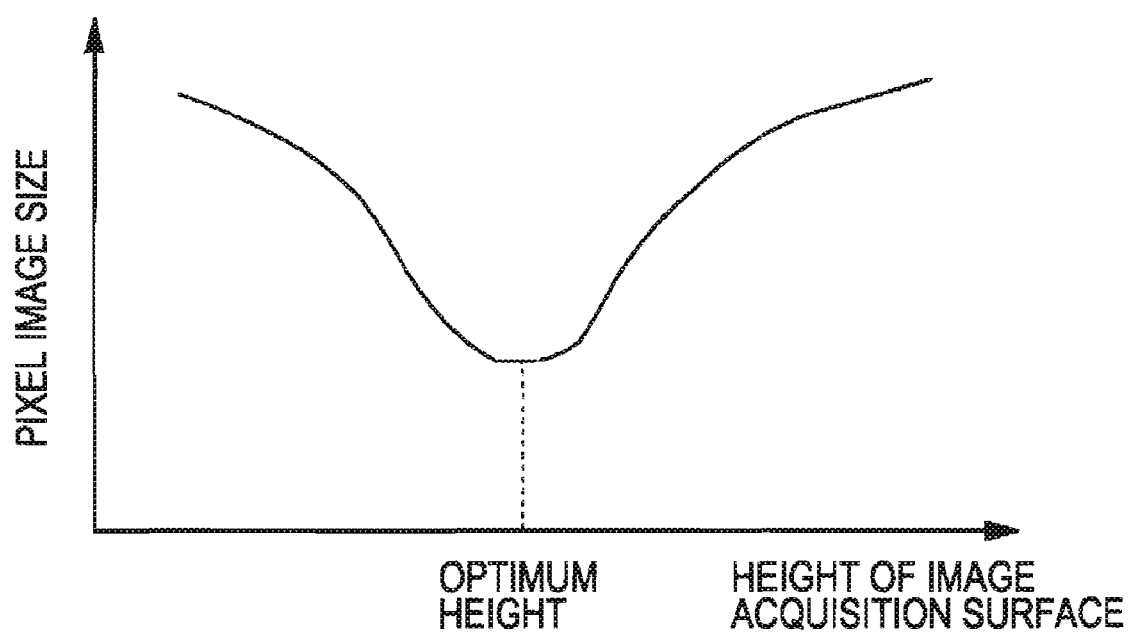
FIG. 13 shows a relationship between a height of an image acquisition surface m3 of the cameras and a pixel image size.

FIG. 13 shows a relationship between the height of the image acquisition surface m3 of the cameras 72L and 72R and the pixel image size. Referring to the drawing, a graph showing variation of a pixel image size with respect to a height of the image acquisition surface m3 from the focusing lens array 15 has only one local minimum point. The pixel image size becomes the minimum pixel image size at the local minimum point. Therefore, the minimum pixel image size can be assumed by specifying the pixel image size at the local minimum point while assuming a corresponding graph, that is, a corresponding local minimum point, according to some statistical values.

When the determination result of step S7 of FIG. 9 is positive, as the height determining unit 83, the position command for indicating a position of the stage 73 is sent to the drive control units 85L and 85R so as to have a height corresponding to the minimum pixel image size stored in the pixel image size storage unit 77 (step S8). Next, as the drive control units 85L and 85R, a drive command for transferring the stage 73 to the position designated according to the position command is generated, and is sent to the motors 74L and 74R (step S9). Accordingly, the stage 73 is transferred.

Next, as the height determining unit 83, a irradiation start command for starting irradiation of an ultraviolet ray onto the irradiation unit 76 is output, and as the irradiation command unit 86, the irradiation start command is received, and an irradiation command for irradiating the ultraviolet ray for a predetermined time is sent to the irradiation unit 76 (step S10). As a result, the irradiation unit 76 irradiates the ultraviolet ray onto the resins 611L and 611R on the bases 62L and 62R. Accordingly, the resins 611L and 611R are cured to form the position determining members 61L and 61R.

Next, as the height determining unit 83, the position command is sent to the drive control units 85L and 85R so that the stage 73 is lifted so as to return to its initial position. Further, as the drive control units 85L and 85R, a control command is generated according to the position command, and is sent to the motors 74L and 74R (step S11). Accordingly, the stage 73 is lifted, and returns to its initial position.

On the other hand, when the determination result of step S7 is negative, as the height determining unit 83, a maximum likelihood algorithm is executed so that the obtained pixel image size becomes equal to the minimum pixel image size (step S12). That is, according to the pixel image size and the height stored in the pixel image size storage unit 77, a position of the stage 73, at which the obtained pixel image size becomes equal to the minimum pixel image size, is obtained, and the position command indicating this position is sent to the drive control units 85L and 85R. Next, as the drive control units 85L and 85R, a drive command for transferring the stage 73 to the position designated according to the position command is generated to be provided to the motors 74L and 74R (step S9). Accordingly, the stage 73 is transferred. Next steps are the same as described above.

Although the resins 611L and 611R are accumulated on the bases 62L and 62R by human hands in the aforementioned manufacturing apparatus 70, this task may be automatically performed. Specifically, for example, an element that supplies an ultraviolet curable resin onto the bases 62L and 62R may be installed, so that the CPU 80 controls the element to accumulate the resins 611L and 611R onto the bases 62L and 62R.

Further, the position determining is performed by trial and error in the aforementioned manufacturing apparatus 70. Therefore, the height of the image acquisition surface m3 from the focusing lens array 15 may be lower than the optimum height at some moments. In this case, although the frame 16 is lifted some time later, the resins 611L and 611R are also lifted along with the frame 16 at this time. That is, the heights of the resins 61!L and 611R are also increased. Accordingly, the position determining member 61L can be formed to have the optimum height. In other words, a resin, which is not lifted along with the virtual position determining plates 71L and 71R even before curing, cannot be used as the resins 611L and 611R. A manufacturing apparatus that can use this resin as the resins 611L and 611R will be now described.

Second Embodiment

Figure 14:
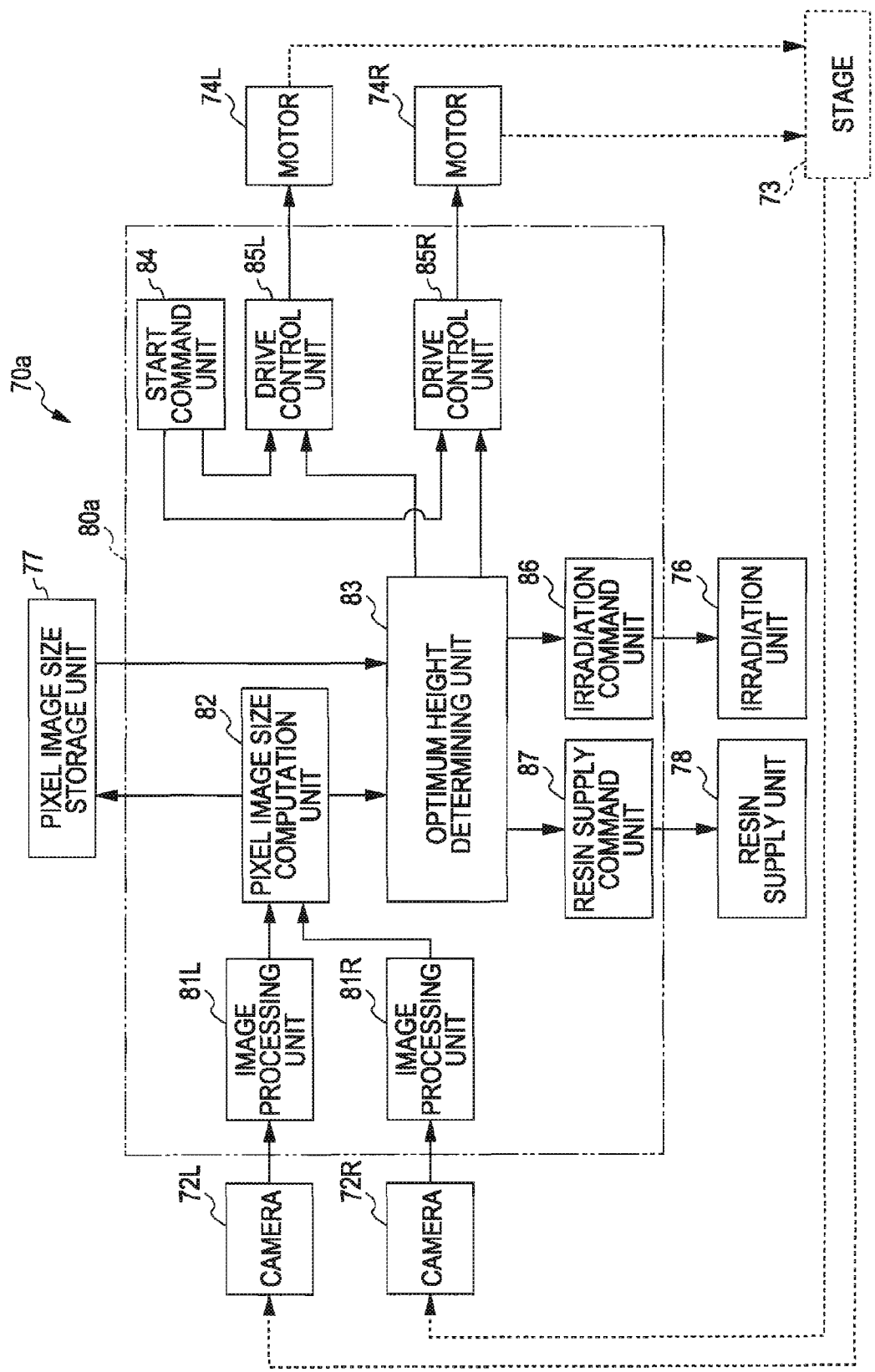
FIG. 14 shows a structure of a manufacturing apparatus according to a second embodiment of the invention.

FIG. 14 shows a structure of a manufacturing apparatus 70a according to a second embodiment of the invention. In the manufacturing apparatus 70a, the resins 611L and 611R are accumulated onto the bases 62L and 62R after the height of the image acquisition surface m3 from the focusing lens array 15 becomes equal to the optimum height. A mechanical structure of the manufacturing apparatus 70a is the same as that of the manufacturing apparatus 70 according to the first embodiment of the invention. A structural difference between the manufacturing apparatus 70a and the manufacturing apparatus 70 lies in that the manufacturing apparatus 70a includes a resin supplying unit 78 and a CPU 80a instead of the CPU 80. The CPU 80a is different from the CPU 80 in that the CPU 80a functions as the resin supplying unit 78. Further, the height determining unit 83 serves to control the resin supplying unit 78.

Figure 15:
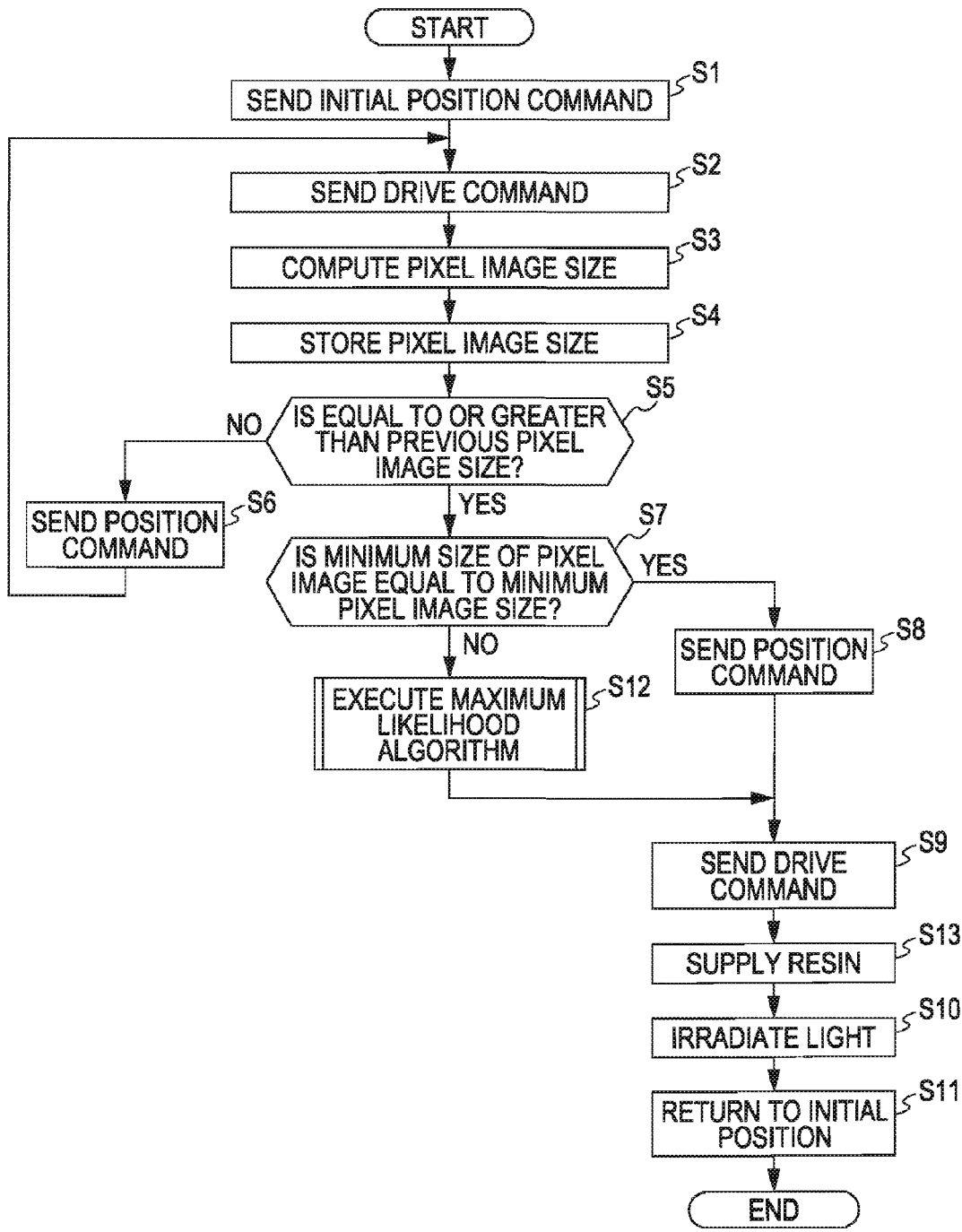
FIG. 15 is a flowchart showing an operation of the CPU of the manufacturing apparatus.

FIG. 15 is a flowchart showing an operation of the CPU 80a. Referring to the drawing, the operation performed by the CPU 80a is the same as that of the CPU 80. However, the resins 611L and 611R are accumulated after the frame 16 and the stage 73 are entirely transferred. That is, after step S9 is performed, as the height determining unit 83, the CPU 80a outputs a resin supply start command for stating supply of a resin to the resin supplying unit 78, and as a resin supply command unit 87, the CPU 80a sends a resin supply command for supplying the resin to the resin supply unit 78 (step S9). As a result, the resin supply unit 78 supplies an ultraviolet curable resin onto the bases 62L and 62R. Accordingly, the resins 611L and 611R are accumulated onto the bases 62L and 62R. Next steps are the same as described above.

In the manufacturing apparatus 70a, the resins 611L and 611R are accumulated onto the bases 62L and 62R after the height of the image acquisition surface m3 from the focusing lens array 15 becomes equal to the optimum height. Therefore, a resin, which is not lifted along with the virtual position determining plates 71L and 71R even before curing can be used as the resins 611L and 611R. That is, any photo curable resin may be used as the resins 611L and 611R by appropriately changing a type of light beams irradiated by the irradiation unit 76.

A thermosetting resin may be used as the resins 611L and 611R by modifying the aforementioned embodiments of the invention. Specifically, an element that heats the resins 611L and 611R on the bases 62L and 62R may be installed so that the CPU 80a controls the element to heat the resins 611L and 611R to be cured. Further, the thermosetting resin may be used as the resins 611L and 611R. An example thereof will now be described.

Third Embodiment

Figure 16:
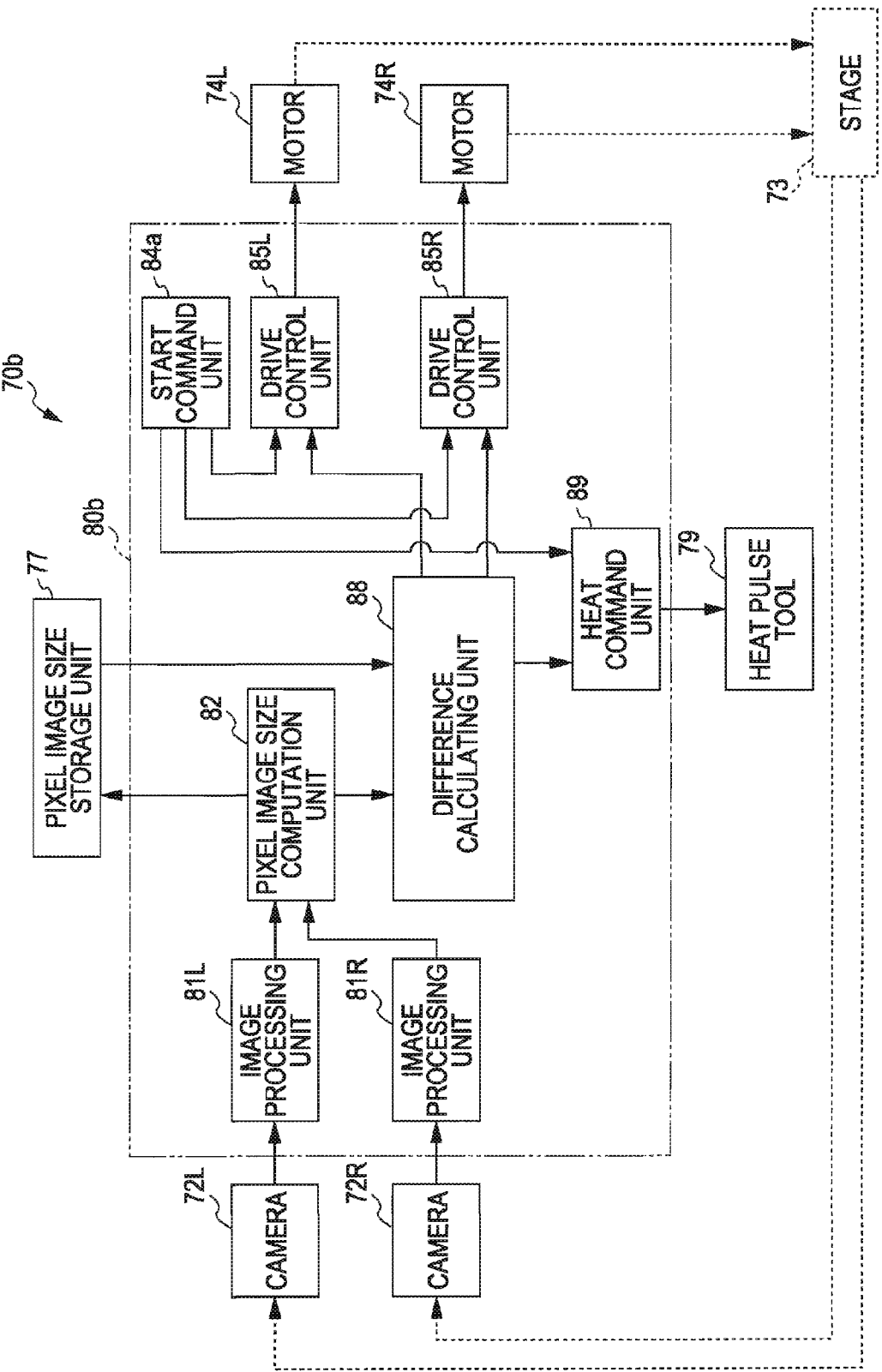
FIG. 16 shows a structure of a manufacturing apparatus according to a third embodiment of the invention.

FIG. 16 shows a structure of a manufacturing apparatus 70b according to a third embodiment of the invention. In the manufacturing apparatus 70b, the thermosetting resin is used as the resins 611L and 611R. A mechanical structure of the manufacturing apparatus 70b is the same as that of the manufacturing apparatus 70 according to the first embodiment of the invention. A structural difference between the manufacturing apparatus 70b and the manufacturing apparatus 70 lies in that the manufacturing apparatus 70b includes a heat pulse tool 79 and a CPU 80b instead of the irradiation unit 76 and the CPU 80. The CPU 80b is different from the CPU 80 in that the CPU 80b functions as a difference calculating unit 88, a staring command unit 84a, and a heat command unit 89 instead of the height determining unit 83, the start command unit 84, and the irradiation command unit 86.

Figure 17:
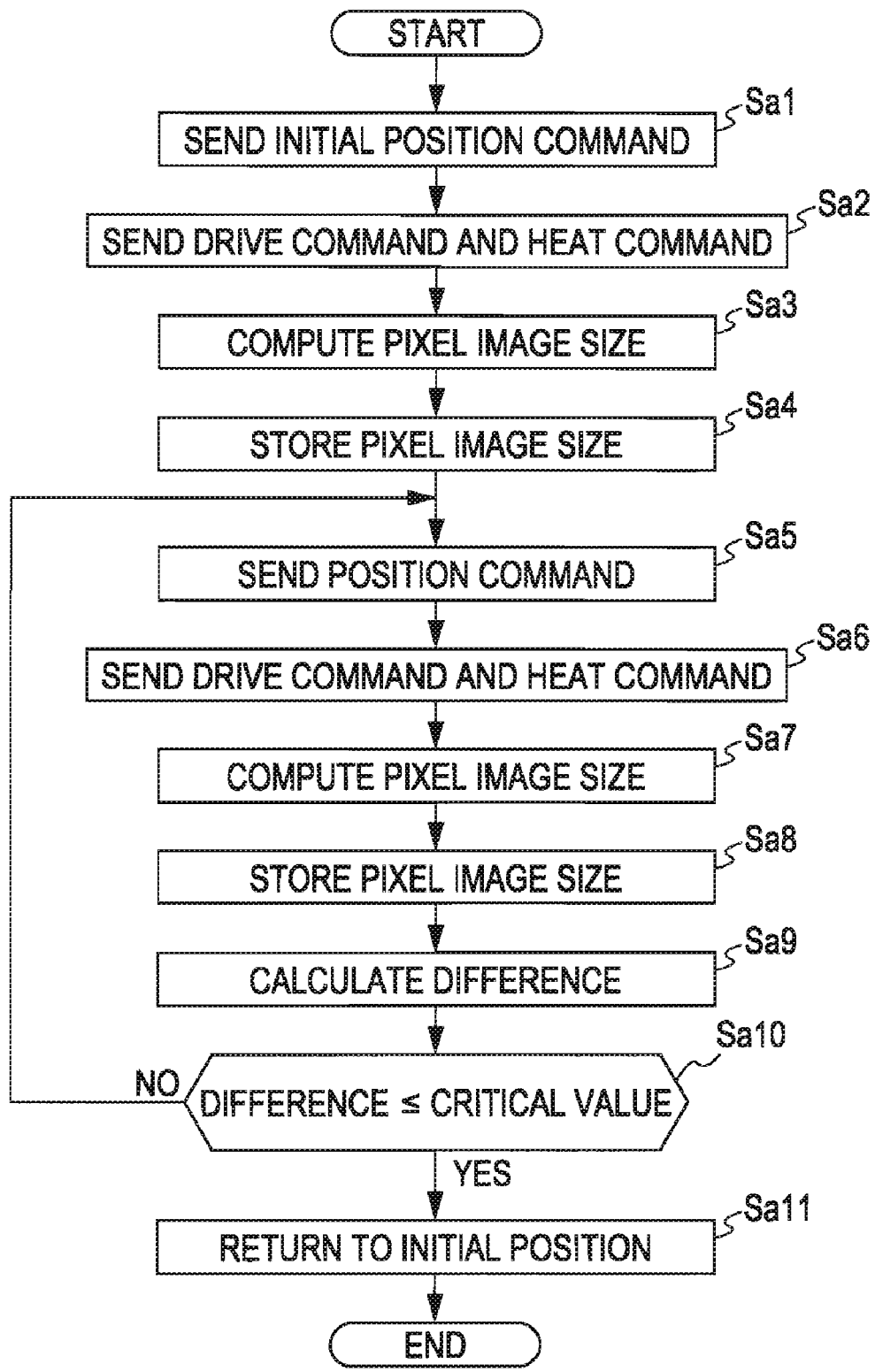
FIG. 17 is a flowchart showing an operation of the CPU of the manufacturing apparatus.

FIG. 17 is a flowchart showing an operation of the CPU 80b. First, referring to the drawing, as the start command unit 84, a position command that designates a predetermined position is sent to the heat command unit 89 and the drive control units 85L and 85R (step Sa1). Next, as the heat command unit 89, a neat command for melting the resins 611L and 611R is generated, and is sent to the heat pulse tool 79. Further, as the drive control units 85L and 85R, a control command for transferring the stage 73 to a position designated according to the position command is generated, and is sent to the motors 74L and 74R (step Sa2). Accordingly, the resins 611L and 611R are melted, and the stage 73 is transferred. In this case, content stored in the pixel image size storage unit 77 is initialized.

As described above, a position indicated by the position command output from the start command unit 84 is determined such that the lower surfaces m4 of the virtual position determining plates 71L and 71R are positioned above the front end surface of the base 62 by a predetermined height. As a result, the stage 73 positioned at its initial position is lowered, and finally, the lower surfaces m4 of the virtual position determining plates 71L and 71R reach predetermined positions. In this process, if the virtual position determining plates 71L and 71R come in contact with the resins 611L and 611R, the position determining members 61L and 61R are pressed by the virtual position determining plates 71L and 71R.

When the lowering is completed, the cameras 72L and 72R acquire an image of the light emitting substrate 14, and output image data. As the image processing units 81L and 81R, the CPU 80b processes the image data received from the cameras 72L and 72R, and generates data that can specify a pixel image size. Further, as the pixel image size computation unit 82, the CPU 80 obtains the pixel image size from the generated data by carrying out computation (step Sa3). Next, as the pixel image size computation unit 82, for each of the cameras 72L and 72R, the obtained pixel image sizes are matched to the height of the image acquisition surface m3 of the present focusing lens array 15, and are stored in the storage unit 77 (step Sa4).

Next, as the height determining unit 83, according to the pixel image size and the height stored in the pixel image size storage unit 77, a position of the stage 73, at which the height of the image acquisition surface m3 from the focusing lens array 15 is not lower than the optimum height and a pixel image size to be obtained becomes similar to the minimum pixel image size, is obtained to send the position command indicating this position to the heat command unit 89 and the drive control units 85L and 85R (step Sa5).

Next, as the heat command unit 89, a heat command for melting the resins 611L and 611R is generated, and is sent to the heat pulse tool 79. Further, as the drive control units 85L and 85R, the drive command for transferring the stage 73 to the position designated according to the position command is generated, and is sent to the motors 74L and 74R (step Sa6). Accordingly, the stage 73 is lowered. Thereafter, the same processes as the aforementioned steps Sa2 and Sa3 are performed (steps Sa7 and Sa8).

As the height determining unit 83, a difference obtained by subtracting a pixel image size currently obtained from a pixel image size previously obtained is calculated (step Sa9). Further, it is determined whether the difference is equal to or less than a predetermined critical value (step Sa10). As described above, the graph showing variation of a pixel image size with respect to a height of the image acquisition surface m3 from the focusing lens array 15 has only one local minimum point. A slope of the graph becomes zero at the local minimum point. The above determining is equivalent to the determining whether it is substantially similar to the height of the image acquisition surface m3 from the present focusing lens array 15. Since the stage 73 is lowered in a condition that the height of the image acquisition surface m3 from the focusing lens array 15 is not less than the optimum height, the difference does not have a negative value.

In this case, if the calculated difference is greater than the predetermined critical value, the processes of steps Sa5 to Sa10 are repeated. On the other hand, if the determination of step Sa5 shows that the calculated difference is equal to or less than the predetermined critical vale, as the height determining unit 83, the position command is sent to the drive control units 85L and 85R so that the stage 73 is lifted so as to return to its initial position. Further, as the drive control units 85L and 85R, a control command is generated according to the position command, and is set to the motors 74L and 74R (step Sa11). Accordingly, the stage 73 is lifted, and returns to its initial position.

As described above, according to the manufacturing apparatus 70b, the thermosetting resin can be used as the resins 611L and 611R. In addition, the fact, in which the position command is generated so that the height of the image acquisition surface m3 from the focusing lens array 15 is not less than the optical height and the transferring of the stage 73 stops when an absolute value of the difference between the pixel image size currently obtained and the pixel image size previously obtained is equal to or less than the predetermined critical value, can apply to the case when the thermosetting resin or the photo curable resin is used as the resins 611L and 611R.

Image Printing Apparatus

Now, an image printing apparatus employing the light emitting device 10 will be described.

Examples of the image printing apparatus include a printer, a printing unit of a copy machine, and a printing unit of a facsimile. In the following descriptions; if the light emitting device 10 and the photosensitive drum 11 exist in plural, reference numerals different from the aforementioned reference numerals will be used in order to distinguish each element.

Figure 18:
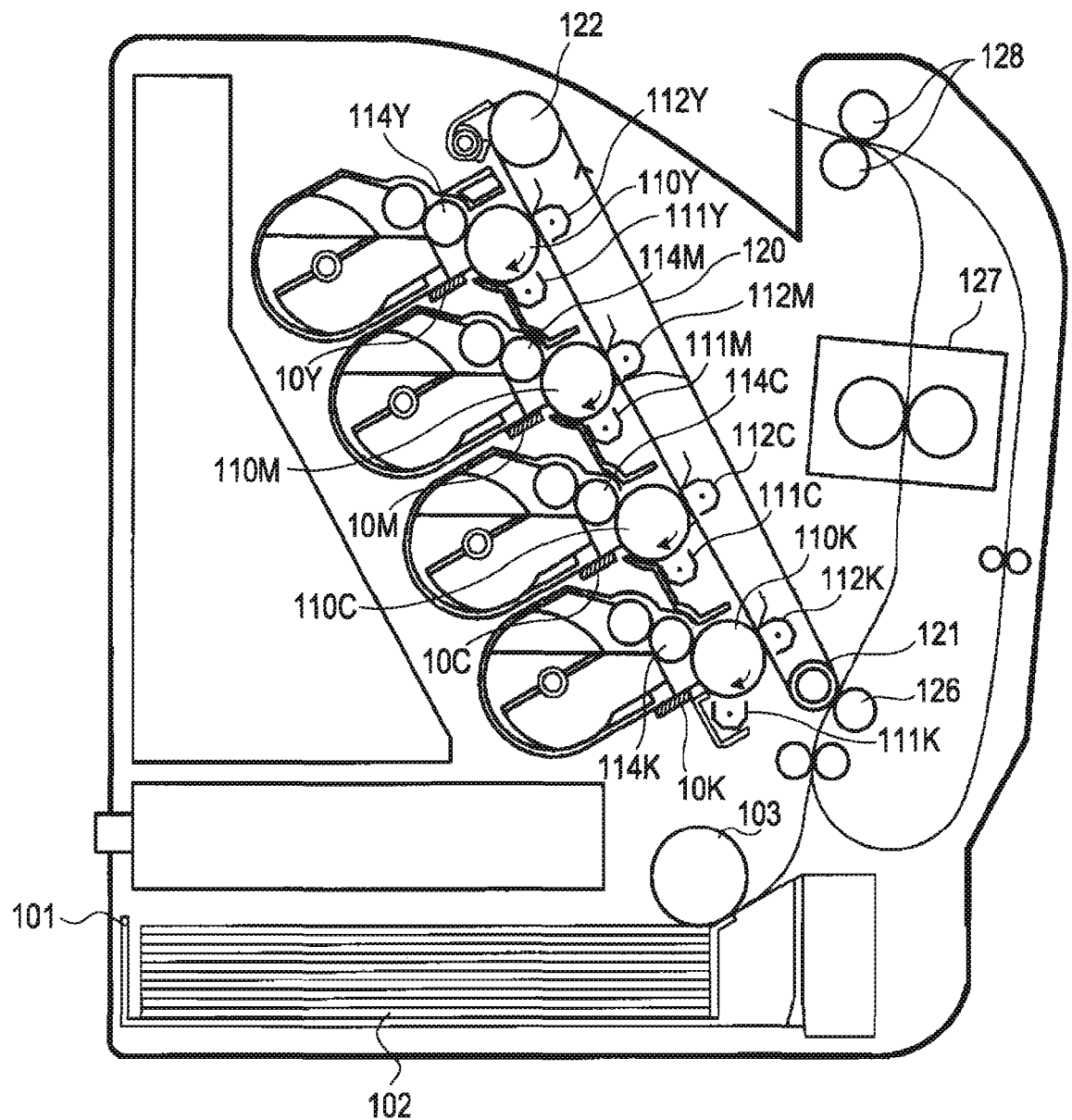
FIG. 18 is a vertical cross-sectional view showing an example of an image printing apparatus using the light emitting device.

FIG. 18 is a vertical cross-sectional view showing an example of an image printing apparatus using the light emitting device 10 as a line type exposure head. The image printing apparatus is a tandem type full color image printing apparatus using a belt intermediate transfer medium method.

In the image printing apparatus, four exposure heads 10K, 10C, 10M, and 10Y having the same structure are respectively disposed at exposing positions of four photosensitive drums (image carriers) 110K; 110C, 110M, and 110Y having the same structure. The exposure heads 10K, 10C, 10M and 10Y are any one of the aforementioned light emitting devices 10 or an electro-optical device according to a modified embodiment thereof.

Referring to the drawing, the image printing apparatus includes a driving roller 121 and a driven roller 122. An endless intermediate transfer belt 120 is wound around these rollers 121 and 122, so as to rotate around the roller 121 and 122 as indicated by arrow. Although not shown, a tension roller or the like that provides tension to the intermediate transfer belt 120 may be included in the image printing apparatus.

Around the intermediate transfer belt 120, the four photosensitive drums 110K, 110C, 110N, and 110Y having photosensitive layers on their outer circumferential surfaces are disposed to be spaced apart from one another by a predetermined gap. The suffix K, C, M, and Y are respectively used to represent black, cyan, magenta, and yellow images. The same applies to other members. The photosensitive drums 110K, 110C, 110M, and 110Y rotate in synchronization with the driving of the intermediate transfer belt 120.

Around the photosensitive drums 110K, 110C, 110M, and 110Y are respectively disposed with corona chargers 111K, 111C, 111M, and 111Y, the exposure heads 10K, 10C, 10M, and 10Y, and developers 114K, 114C, 114M, and 114Y. The corona chargers 111K, 111C, 111M, and 111Y equipotentially charge the outer circumferential surfaces of the corresponding photosensitive drums 110K, 110C, 110M, and 110Y. The exposure heads 10K, 10C, 10M, and 10Y input an electrostatic latent image onto the charged outer circumferential surfaces of the photosensitive drums 110K, 110C, 110M, and 110Y. Each of the exposure heads 10K, 10C, 10M, and 10Y is disposed such that arrangement direction of a plurality of the EL elements 14 follows a bus line (a main scanning direction) of the photosensitive drums 110K, 110C, 110M, and 110Y. The input of the electrostatic latent image is carried out by irradiating light onto the photosensitive drum 110K, 110C, 110M, and 110Y by the plurality of EL elements 14. The developers 114K, 114C, 114M, and 114Y attach toner as a developing material onto the electrostatic latent image, so that images, that is, visible images, are formed on the photosensitive drums 110K, 110C, 110M, and 110Y.

The black, cyan, magenta, and yellow images, which are respectively formed in a process of forming each monochrome image of four colors, are firstly transferred onto the intermediate transfer belt 120 in a sequential manner, and are superimposed onto the intermediate transfer belt 120, thereby obtaining a full color image. The inner side of the intermediate transfer belt 120 is disposed with four first transfer corotrons (transfer units) 112K, 112C, 112M, and 112Y. The first transfer corotrons 112K, 112C, 112M, and 112Y are respectively disposed near the photosensitive drums 110K, 110C, 110M, and 110Y, and transfer images onto the intermediate transfer belt 120 passing between the photosensitive drums 110K, 110C, 110M, and 110Y and the first transfer corotrons 112K, 112C, 112M, and 112Y by electrostatically absorbing the images from the photosensitive drums 110K, 110C, 110M, and 110Y.

A sheet 102 on which an image is finally formed is fed sheet by sheet from a paper feed cassette 101 by a pickup roller 103, and is conveyed to a nip between the intermediate transfer belt 120 in contact with the driving roller 121 and a second transfer roller 125b. The full color image formed on the intermediate transfer belt 120 is secondly transferred onto one side of the sheet 102 by the second transfer roller 126 at the same time, and is fixed onto the sheet 102 by passing through a fixing roller pair 127, that is, a fixing unit. Thereafter, the sheet 102 is discharged by a paper discharge roller pair 128 into a paper discharge cassette disposed at the upper portion of the apparatus.

Now, an image printing apparatus according to another embodiment of the invention will be described.

Figure 19:
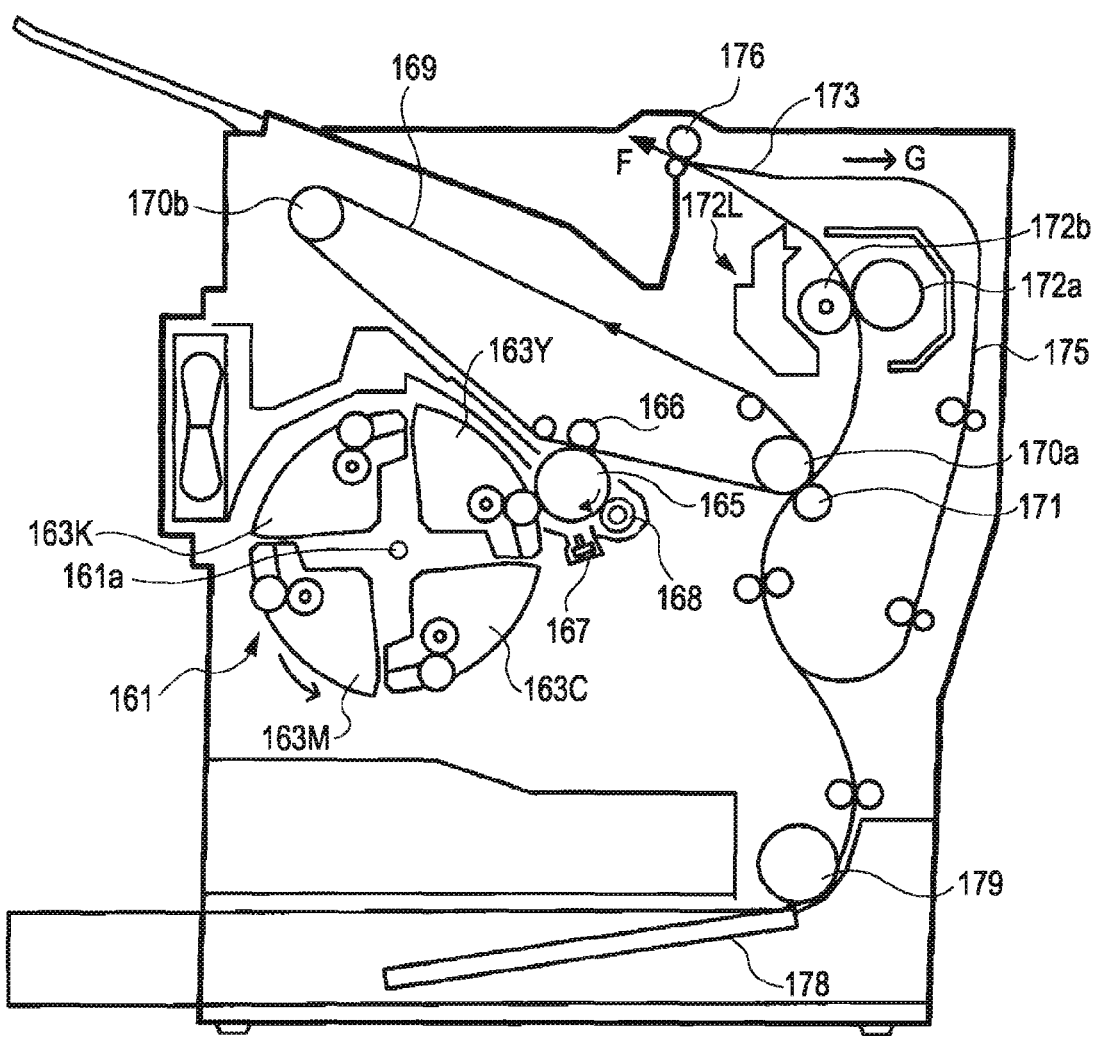
FIG. 19 is a vertical cross-sectional view of another image printing apparatus using the light emitting device.

FIG. 19 is a vertical cross-sectional view of another image printing apparatus using any one of the light emitting devices 10 as a line type exposure head. The image printing apparatus is a rotary development type full color image printing apparatus using a belt intermediate transfer medium method.

In the image printing apparatus of the drawing, around a photosensitive drum (an image carrier) 165 is disposed with a corona charger 168, a rotary type development unit 161, an exposure head 167, and an intermediate transfer belt 169.

The corona charge 168 equipotentially charges the outer circumferential surface of the photosensitive drum 165. The exposure head 167 inputs an electrostatic latent image onto the charged outer circumferential surface of the photosensitive drum 165. The exposure head 167 is any one of the aforementioned electro-optical devices 10 and the optical device according to the modified embodiment, and is disposed such that an arrangement direction of the plurality of EL elements 14 follows a bus line (a main scanning direction) of the photosensitive drum 165. The input of the electrostatic latent image is carried out by irradiating light onto the photosensitive drum 165 from the plurality of EL elements 14.

The development unit 161 is a drum in which four developers 163Y, 163C, 163M, and 163K are disposed to be spaced apart by an angular distance of 90°, and is rotatable about an axis 161a in a counterclockwise direction. The developers 163Y, 163C, 163M, and 163K respectively supply yellow, cyan, magenta, and black toners onto the photosensitive drum 165, and attach the toners as a developing material onto the latent image, so that an image, that is, a visible image, are formed on the photosensitive drum 165.

The endless intermediate transfer belt 169 is wound around a driving roller 170a, a driven roller 170b, a first transfer roller 166, and a tension roller, and rotates around these rollers in a direction indicated by arrow. The first transfer roller 166 electrostatically absorbs the image from the photosensitive drum 165, so that the image is transferred onto the intermediate transfer belt 169 passing between the photosensitive drum 165 and the first transfer roller 166.

Specifically, when the photosensitive drum 165 initially makes one revolution, the latent image for a yellow Y image is input to the exposure head 167 so that the yellow image is formed by the developer 163Y, and the image is then transferred onto the intermediate transfer belt 169. Next, when making one revolution secondly, a latent image for a cyan C image is input to the exposure head 167 so that the cyan image is formed by the developer 163C, and the image is then transferred onto the intermediate transfer belt 169 so as to be superimposed onto the yellow image. While the photosensitive drum 165 makes four revolutions in this manner, the yellow, cyan, magenta, and block images are sequentially superimposed onto the intermediate transfer belt 169, thereby forming the full color image onto the intermediate transfer belt 169. In the case of double-side printing, a first color image is transferred onto the upper and lower surfaces of the intermediate transfer belt 160, and thereafter a second color image is transferred onto the upper and lower surfaces of the intermediate transfer belt 169, and so on. In this manner, a full color image is formed on the intermediate transfer belt 169.

In the image printing apparatus, a sheet conveying path 174 is formed to pass a sheet. The sheet is taken out sheet by sheet by the pickup roller 179 from the paper feed cassette 178, so as to move forwards the sheet conveying path 174 by a conveyance roller, and then passes through a nip between the intermediate transfer belt 169 in contact with the driving roller 170a and the second transfer roller 171. The second transfer roller 171 transfers an image onto one side of the sheet by electrostatically absorbing the full color image at the same time, from the intermediate transfer belt 169. The second transfer roller 171 is constructed to approach or be separated to/from the intermediate transfer belt 169 by a clutch (not shown). Moreover, when the full color image is transferred onto the sheet, the second transfer roller 171 is abutted to the intermediate transfer belt 169. Whereas, while the developing is repeated on the intermediate transfer belt 169, the intermediate transfer belt 169 is separated from the transfer roller 171.

The sheet on which an image is transferred in the above manner is conveyed to the fixing unit 172, and passes between a heat roller 172a and a pressure roller 172b of the fixing unit 172, thereby fixing the image onto the sheet. After the fixing process is completed, the sheet is drawn into a paper discharge roller pair 176 so as to move forwards in direction F. In the case of double-side printing, the paper discharge roller pair 176 reversely rotates after the sheet mostly passes the paper discharge roller pair 176, and comes into a duplex printing conveying path 175 as indicated by arrow G. Thereafter, the image is transferred onto the other side of the sheet by the second transfer roller 171, and the fixing process is again carried out by the fixing unit 172. Then, the sheet is discharged to the paper discharge roller pair 176.

The image printing apparatus of FIGS. 18 and 19 uses the light emitting device 10, in which the distance between the focusing lens array 15 and the photosensitive drum is equal to the optimum height, as an exposure head. Therefore, an image can be further precisely formed on the photosensitive drum. That is, printing quality can be improved. In addition, when the image printing apparatus is placed, a task for matching the distance between the focusing lens array 15 and the photosensitive drum to the optimum height can be carried out by only brining the position determining members 61L and 61R into contact with the bearing 13. Therefore, the task can be significantly easily carried out in comparison with the case of using a mechanical adjusting tool such as a screw or the like. In addition, since the light emitting device 10 employing organic EL elements is used as a light emitting element, the image can be further clearly formed on the photosensitive drum in comparison with the case of using other elements. Therefore, the printing quality is further improved.

Although the image printing apparatus has been exemplified in the above descriptions, the light emitting device 10 may be used in other electrophotographic image printing apparatus. For example, the light emitting device is also applicable to an image printing apparatus which directly transfers an image onto a sheet from the photosensitive drum instead of using the intermediate transfer belt, to an image printing apparatus which forms a monochrome image, or to an image printing apparatus which uses a photosensitive belt as an image carrier.

Modified Embodiment

The image printing apparatus may include a light emitting device obtained by modifying the light emitting device 10. The light emitting device may be manufactured by using the manufacturing method and apparatus according to the aforementioned embodiments of the invention. In addition to the above description, the light emitting device will now be described.

A mechanism used to transfer a focusing lens array is not limited to a tool using a ball screw. For example, other well-know tools such as a gear or a cam may be used. Of course, an element that drives these tools is not limited to a motor. For example, the element may be driven by human force. Further, the number of cameras, ball screws, and motors may be respectively one, or three or more.

Furthermore, instead of a stage used to support a camera when a distance between the focusing lens array and an image acquisition surface is modified, a frame used to support the focusing lens array or an element that supports a corresponding frame may be transferred. In other words, is preferable that a relative position between the focusing lens array and the image acquisition surface can be modified.

What is claimed is:

1. A light emitting device, in which an image carrier is charged, a latent image is formed on a charged surface of the image carrier, an image is formed by attaching toner onto the latent image, and which is used in an image printing apparatus transferring the image onto other object and forms the latent image by irradiating light onto the charged surface, the light emitting device comprising:
    an electro-optical substrate that forms an optical image;
    a focusing lens array in which light used to form the optical image is incident from one end thereof and light used to form an erect image of a corresponding optical image is emitted from the other end thereof;
    a frame in which the focusing lens array is fixed, a surface side of the frame facing the charged surface; and
    two position determining members which are formed of resin, each position determining member is disposed on a base portion of a short side of the surface side of the frame, each position determining member comes in contact with a bearing of a supporting body that supports the image carrier, and determines a distance between the focusing lens array and the image carrier by its own height.

2. An image printing apparatus having the light emitting device according to claim 1, and irradiating light emitted from the other end onto the charged surface.

3. A system comprising a manufacturing apparatus for the light emitting device according to claim 1 and the light emitting device of claim 1, the manufacturing apparatus comprising:
    a compression unit which compresses resin that forms the position determining member in association with the frame;
    a driving unit which relatively transfers the frame and the compression unit to which the focusing lens array is fixed; and
    a cure promoting unit which cures the resin disposed between the frame and the compression unit relatively transferred by the driving unit.

4. The system according to claim 3,
wherein pixels constituting the optical image are arranged on the electro-optical substrate,
wherein the manufacturing apparatus includes:
an image acquisition unit which has an image acquisition surface, forms a pixel image on the image acquisition surface by acquiring an image of the pixel through the focusing lens array, and generates image data that indicates distribution of light intensity of the image acquisition surface;
a pixel image size computation unit which computes and obtains a size of the pixel image based on the generated image data; and
an optimum position determining unit which controls transferring performed by the driving unit, determines whether the distance between the focusing lens array and the image acquisition surface is substantially equal to a image surface distance that is intrinsic to the focusing lens array, and, if it is substantially equals thereto, stops the relative-transferring performed by the driving unit, and
wherein relative heights of the frame side surface of the compression unit and the image acquisition surface are equal to relative heights of the frame side surface of the supporting body and a surface on which light is irradiated from the image carrier.

5. The system according to claim 4, comprising a resin supply unit which supplies the resin between the frame and the compression unit transferred by the driving unit.

6. A system comprising a manufacturing apparatus for the light emitting device according to claim 1 and the light emitting device of claim 1, the manufacturing apparatus comprising:
a fusion promotion unit which heats and melts the resin that forms the position determining member;
a compression unit which compresses the melted resin in association with the frame; and
a driving unit which relatively transfers the frame and the compression unit to which the focusing lens array is fixed.

* * * * *